L. P. RICHMAN.
FLY TRAP.
APPLICATION FILED JULY 7, 1913.
1,085,701.
Patented Feb. 3, 1914.
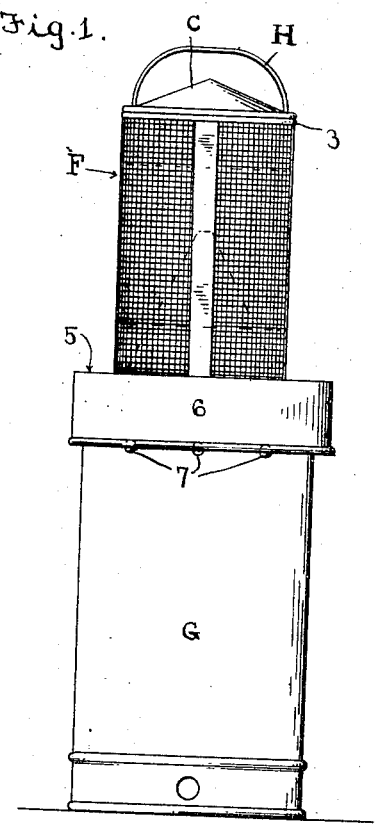
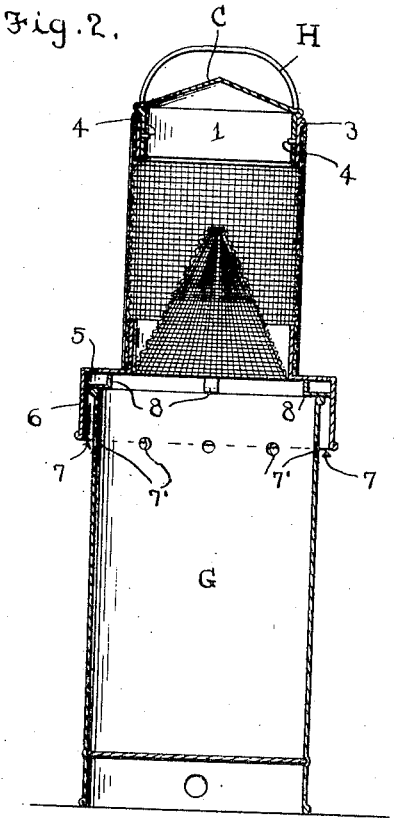
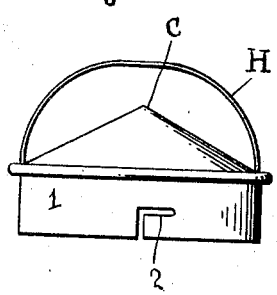
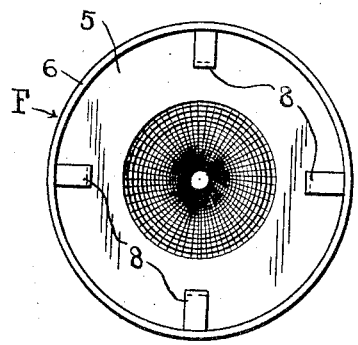
Witnesses
Inventor
L. P. Richman

UNITED STATES PATENT OFFICE.

LOUIS P. RICHMAN, OF FOWLER, CALIFORNIA, ASSIGNOR OF ONE-THIRD TO MARION H. MINER, OF FOWLER, CALIFORNIA, AND ONE-THIRD TO G. C. QUIMBY, OF FRESNO, CALIFORNIA.

FLY-TRAP.

1,085,701. Specification of Letters Patent. Patented Feb. 3, 1914.

Application filed July 7, 1913. Serial No. 777,764.

*To all whom it may concern:*

Be it known that I, LOUIS P. RICHMAN, a citizen of the United States, residing at Fowler, in the county of Fresno and State of California, have invented certain new and useful Improvements in Fly-Traps; and I do declare the following to be a full, clear, and exact description of the invention, such as will enable others skilled in the art to which it appertains to make and use the same.

This invention relates to traps, and more especially to those which are employed for catching insects, and the object of the same is to mount an ordinary fly trap on the cover of a garbage can or other receptacle in such a manner that insects such as flies crawling up on the outside of the garbage can or rising from its interior, will be trapped. This and other objects are accomplished by constructing the invention in the manner hereinafter more fully described and claimed, and as shown in the drawings wherein—

Figure 1 is a side elevation of this device complete, and Fig. 2 a central vertical longitudinal sectional view thereof. Fig. 3 is a detail of the cover removed and shown in side elevation. Fig. 4 is a bottom plan view of the fly trap as a whole, removed from the can.

In the drawings the letter G designates broadly a receptacle such as a garbage can in the present instance, although it may be any suitable and preferably cylindrical receptacle whose nature and contents are such that flies or other insects are apt to be drawn thereto.

The letter F is an ordinary fly trap comprising in the present instance a cylindrical body of wire screen, and a cone of wire screen therein, its upper end being normally open and closed by a cover C preferably having a handle H. In order that the entire device may be lifted off the garbage can, I preferably provide the skirt 1 of this cover with slots of bayonet joint shape as shown at 2, and the interior of the mouth 3 of the fly trap F with pins 4 so that when the cover is placed on said mouth the open ends of the bayonet-joint slots pass over the pins, after which the cover is given a partial rotation to lock it in place. Any other suitable and equivalent form of connecting this cover or closure with the mouth of the fly trap might be employed, but I illustrate and describe this connection as one which would answer and is typical of any that might be used. The details of the garbage can are not necessary to amplify, and it may well be cylindrical and of sheet metal as commonly employed in cities at the present time.

Coming now more particularly to the details of the present invention, the entire fly trap is mounted on a sheet metal ring 5 which projects outward from the base of the trap, and pendent from the edge of this ring is a skirt 6, also of sheet metal and whose interior circumference is larger than the exterior circumference of the garbage can G at its open upper end—thereby leaving an annular space 7 between these elements when they are placed in active relation. Such relation consists in disposing the fly trap and the base thereof (which includes the ring 5 and the skirt 6) over the mouth of the can, at which time the skirt 6 will be spaced away from the sides of the can for some little distance. In the can at proper points near its upper end are formed holes 7', and when the parts are assembled these holes should be partly exposed under the lower edge of the skirt 6 as seen in Fig. 1.

Within the base of the fly trap, and preferably in the angle between the ring 5 and the skirt 6, are lugs 8 which may well be formed of sheet metal strips bent into angular shape and soldered at their extremities to the ring and skirt respectively; and when the parts are assembled these lugs rest on the upper edge of the garbage can G and hold the entire base slightly elevated therefrom. I might say that it is at this time that the holes 7' are partly exposed beneath the lower edge of the skirt. The spacing of the elements thus brought about, permits flies crawling up on the exterior or interior of the garbage can to pass over the top of the same. The purpose of the holes is to permit those who are on the exterior and desire to do so to crawl through the holes into the interior of the garbage can. The purpose of the space over the mouth of the can is to permit the flies to crawl up under the skirt and pass in under the ring where they join those already in the can and are trapped. This result is accomplished by the nature of the insect, which will rise toward the light; and all insects within the can or on the under side of the ring will be attracted by the light which shows through the wire mesh of which the trap F is composed. Rising through its cone they are trapped therein in a well known manner.

The proportions and materials of parts are not essential, but by preference I would make them entirely of metal and I would make the fly trap and its ring and skirt of proper size to fit over a garbage can such as is in ordinary daily use. If this can has a cover, the same is laid aside and the fly trap and its attachment put in place as shown in Fig. 1. Flies or other insects attracted by the garbage rise inside or outside the can and are trapped within the skirt and under the ring, whence they are attracted upward into the fly trap by the light shining through the screen in a well known manner. From time to time the cover C is removed from the fly trap F, and the trapped flies or insects emptied or killed. The use of the bayonet joints and pins or studs, or other form of connection between this cover and the fly trap, permits the latter to be raised bodily by the handle H of the cover. The fact that the skirt 6 is a little larger than the mouth of the can G has the advantage, in addition to the trapping of the flies on the exterior of the can as above explained, that it permits the same to be passed over a can which may be a little larger than standard size or may be distorted out of a truly cylindrical shape.

What is claimed as new is:

The combination with a can adapted to contain garbage or the like, the same having an open upper end and holes in its wall just beneath said end; of a fly trap, a ring secured around the base of the trap, a skirt secured around the periphery of the ring and depending from the same, its interior diameter being larger than the exterior diameter of the can, and its width being sufficient to cause its lower edge to partly cover said holes, means within the ring for supporting the same upon and above the edge of the can, and a removable cover for the fly trap.

In testimony whereof I have hereunto set my hand in presence of two subscribing witnesses.

LOUIS P. RICHMAN.

Witnesses:
GILBERT C. QUIMBY,
WILLARD G. CRAM.